United States Patent [19]
Fay

[11] 3,766,608
[45] Oct. 23, 1973

[54] HARNESSING DEVICE

[75] Inventor: Robert B. Fay, Medway, Mass.

[73] Assignee: Dennison Manufacturing Company, Framingham, Mass.

[22] Filed: June 9, 1972

[21] Appl. No.: 261,506

[52] U.S. Cl. ............................................. 24/16 PB
[51] Int. Cl. ........................................... B65d 63/00
[58] Field of Search ...................... 24/20 TT, 30.5 P, 24/73 PB, 17 A, 17 B, 17 R, 16 PB; 248/74 PB; 100/33 PB; 40/21 C

[56] References Cited
UNITED STATES PATENTS

| | | | |
|---|---|---|---|
| 515,747 | 3/1894 | Carr | 24/16 PB UX |
| 3,106,028 | 10/1963 | Baumgartner | 24/16 PB |
| 3,189,961 | 6/1965 | Heller | 24/20 TT |
| 3,457,598 | 7/1969 | Mariani | 24/16 PB |
| 3,590,442 | 7/1971 | Geisinger | 24/16 PB |

*Primary Examiner*—Donald A. Griffin
*Attorney*—George E. Kersey

[57] ABSTRACT

A harnessing device formed by a locking head and an attached, apertured strap. The head contains a longitudinal guide channel for receiving the strap, after encirclement of items to be harnessed, and an internal locking tang. The latter is deflected with respect to relatively narrow auxiliary channels on opposite sides of the guide channel. One of the auxiliary channels receives the locking tang during the harnessing of the items; the other auxiliary channel contains a stop against which the locking tang becomes abutted in planar engagement by the reverse thrust of the harnessed items.

29 Claims, 6 Drawing Figures

HARNESSING DEVICE

BACKGROUND OF THE INVENTION

This invention relates to the harnessing of items, and more particularly, to the secure harnessing of items to insure against their accidental release.

Harnessing devices are widely used for the bundling of objects. Such devices are typically formed by a serrated strap fitted to an apertured head containing an internal pawl that engages the serrations of the strap; or by an apertured strap fitted to buckle-like head, with a tongue that enters the apertures of the strap.

Harnessing devices with serrated straps have the disadvantage of being only as secure as their pawls. Where the items that are harnessed are heavy or are subjected to rough handling, the items often become accidentally released, for example, by failure of the pawls. Attempts have been made to strengthen serrated strap devices, but this has resulted in considerable complexity without achieving the desired end result of providing security against accidental release of the harnessed items. Similar objections apply to harnessing devices with buckle-like heads. In these devices, a tongue which enters the strap apertures rests against the head of the buckle near its opening and is deflected by the strap. The tongue is typically a cantilever attachment to the buckle-like head, which tends to be unduly stiff in the direction of forward thrust during harnessing, and insufficiently stiff in the direction of reverse thrust applied by the strap because of the harnessed items. In addition the tongue is exposed to external interferences that can cause an accidental release of the harnessed items.

Accordingly, it is an object of the invention to achieve a harnessing device for the secure harnessing of items. A related object is to achieve secure harnessing of items without the need for employing a complex harness configuration.

Another object of the invention is to prevent accidental release of the harness. A related object is to prevent external interference with the pawl or tongue-like member that is used to engage the strap of the harnessing device.

Still another object is to provide ease of harnessing and resistance to spontaneous unharnessing. A related object is to provide a head configuration that facilitates the cinching of a harnessing strap, but, at the same time, impedes the tendency of tightly cinched items to pull the strap from its head.

A further object of the invention is to limit the tendency of the pawl or tongue of a harnessing device to accumulate excessive stresses at its point of engagement with a harnessing strap.

SUMMARY OF THE INVENTION

In accomplishing the foregoing and related objects, the invention provides a harnessing device with a head that has a longitudinally extending guide channel and a locking tang that is confined within the head and mounted for pivotal movement with respect to the channel. An apertured strap, desirably in the form of a ladder structure, is used to encircle the items to be harnessed and extends perpendicularly from the locking head with respect to its longitudinal channel. The internal position of the locking tang prevents external interferences and thus helps prevent accidental release of the harnessed items. The combination of the locking tang with the apertured strap permits harnessing to take place without the objectionable stress concentration often found in other kinds of harnessing devices.

In accordance with one aspect of the invention, the harnessing device includes an auxiliary channel, narrower than the guide channel and located on one side, for receiving the locking tang as it is deflected by reverse thrust applied to the strap. The use of such an auxiliary channel tends to limit any objectionable lateral deflection of the locking tang after items have become harnessed. It also permits a greater deflection of the locking tang in the direction of reverse thrust. As this deflection increases, the resistance of the locking tang to further deflection also increases.

In accordance with another aspect of the invention, the channel for the locking tang includes an inclined planar stop against which the locking tang becomes abutted by the reverse thrust applied to the strap. The planar abutment causes a distribution of forces so that there is no undue concentration of stresses. In addition, when the tang is abutted against the stop, the maximum compressive stress is applied, tending to hold the tang in its lock position.

In accordance with still another aspect of the invention, the desired locking effect of the tang can be accentuated by having the walls of the auxiliary channel converge towards the stop in order to provide a wedge effect.

In accordance with a further aspect of the invention, another relatively narrow auxiliary channel is located on the other side of the guide channel. The locking tang is pivotally mounted in the second auxiliary channel and is received by that channel as the strap is subjected to forward thrust. This channel tends to prevent any objectionable lateral deflection of the locking tang during the harnessing of items.

In accordance with a still further aspect of the invention, the locking tang is pivotally mounted in the second auxiliary channel for easy deflection in the forward direction during the harnessing of items, while affording increasing resistance to deflection in the reverse direction after the items have been harnessed. For this purpose the locking tang is desirably mounted at an angle of less than 45° with respect to the guide channel.

In accordance with yet other aspects of the invention, the locking tang can be a curved member with a convex surface contacted by the strap, for example, the rungs of a ladder strap, when reverse thrust is applied. The strap also can have a width in excess of the guide channel. This permits the strap, when made of a material such as nylon, to be stretched over the major portion of its length to substantially the same width as that of the guide channel, increasing the tensile strength of the strap per unit of cross-section. Alternatively, when the strap is of an elastomeric material, the excess width provides a desired wedging effect.

BRIEF DESCRIPTION OF THE DRAWINGS

Other aspects of the invention will become apparent after considering several illustrative embodiments taken in conjunction with the drawings which.

DETAILED DESCRIPTION

Figure 1:
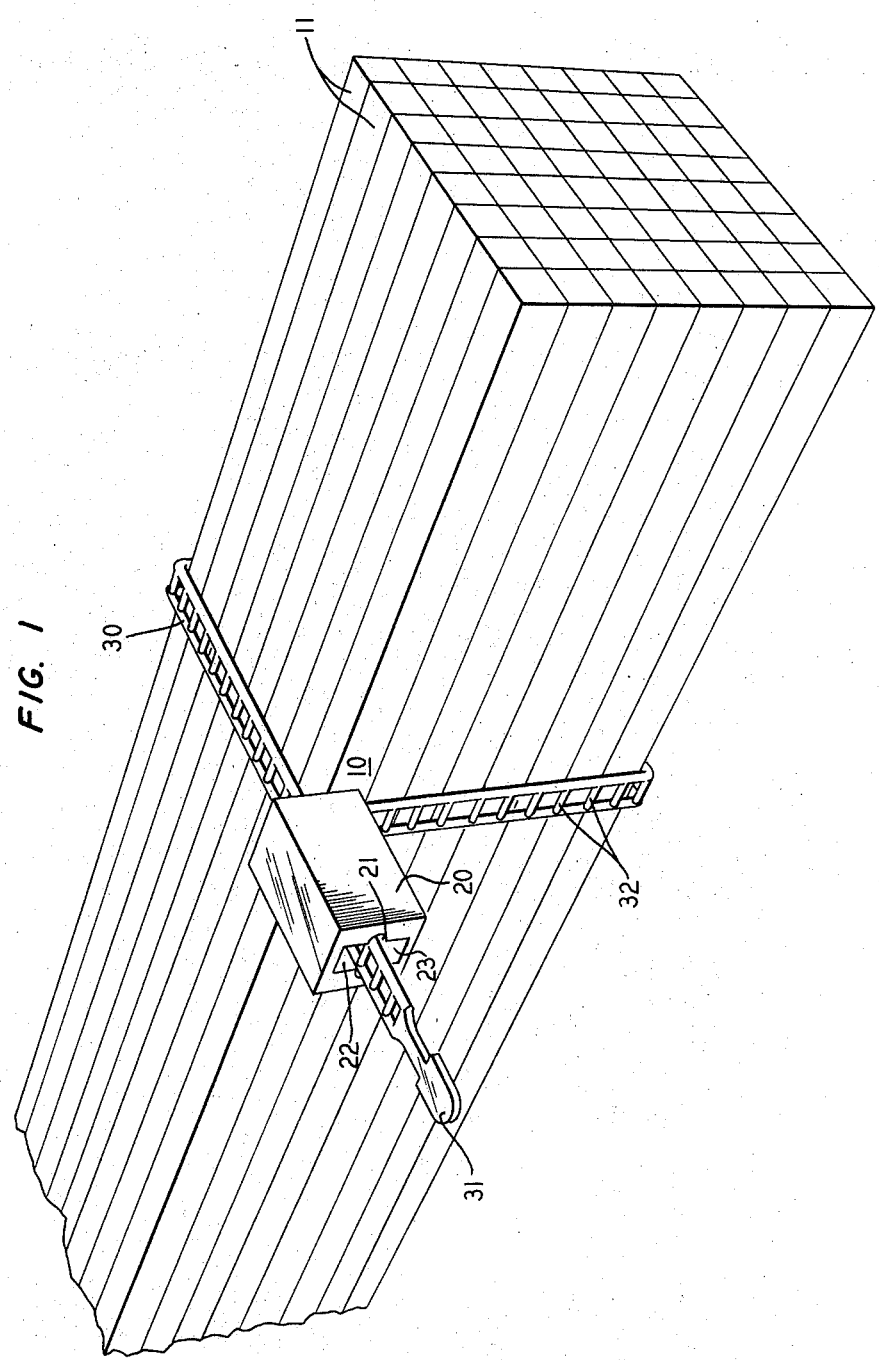
FIG. 1 is a perspective view of a harnessing device in accordance with the invention, being used to harness a bundle of items.

Turning to the drawings, FIG. 1 shows a harnessing device 10 in accordance with the invention formed by a locking head 20 with an attached strap 30. The latter is in the form of a ladder structure that extends perpendicularly with respect to a corresponding guide channel 21 extending longitudinally through the head 20. When a group of items 11 is to be harnessed, they are encircled by the strap 30 and a tab 31 at the free end of the strap is inserted into and through the guide channel 21. The strap 30 is drawn through the locking head 20 by applying a forward thrust to it, and an internal locking tang (not shown in FIG. 1) is deflected with respect to associated auxiliary channels 22 and 23. The locking tang successively engages rungs 32 of the strap 30 until the items 11 are securely harnessed. Reverse thrust produced on the strap 30 by the harnessed items 11 draws the locking tang against an internal stop (not shown) and prevents the items 11 from becoming unbundled. The device 10, including its head 20 and strap 30, is desirably made out of a resilient elastomeric material or a plastic material such as nylon.

Figure 2:
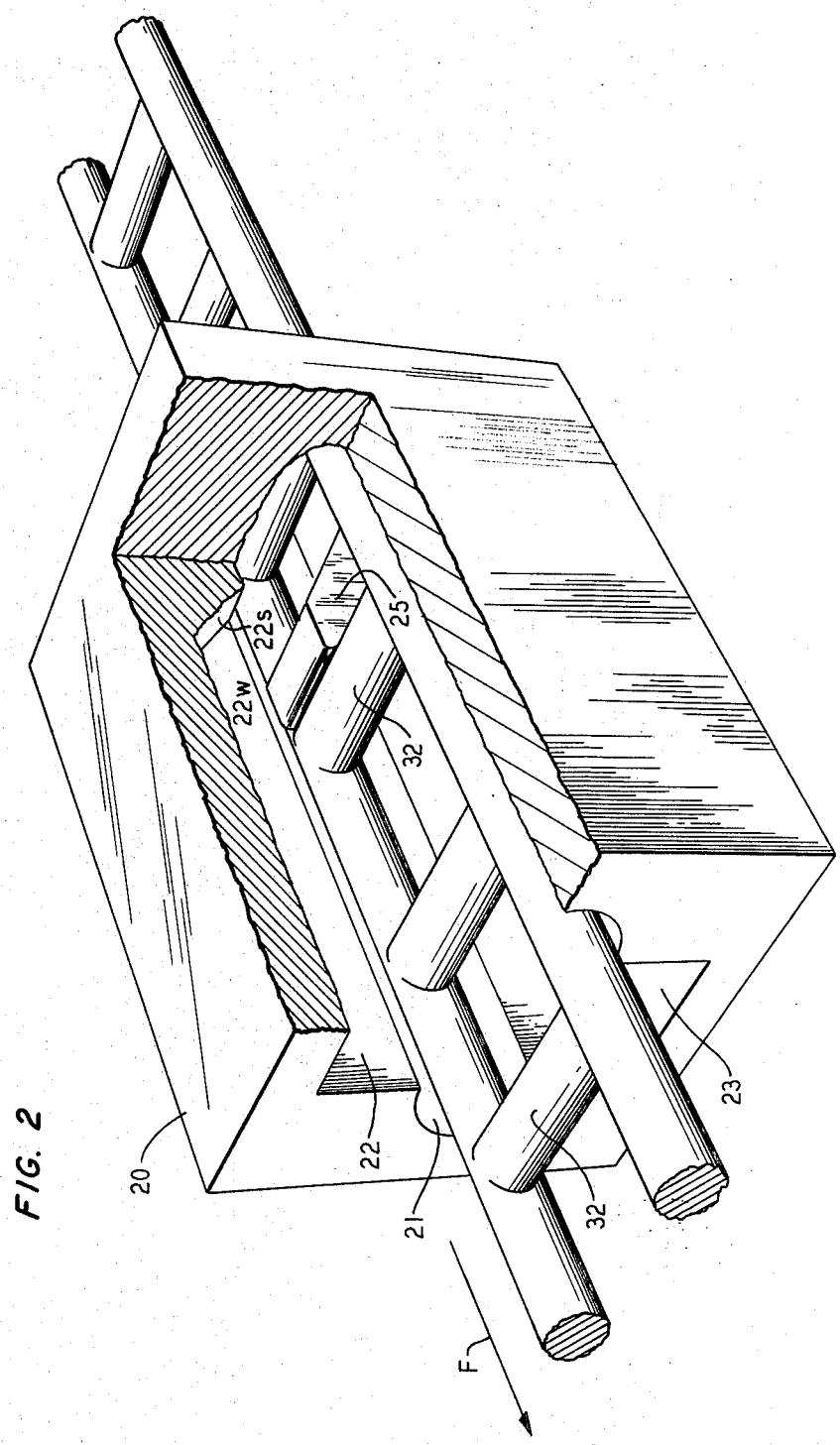
FIG. 2 is a perspective view of the head portion of the harnessing device of FIG. 1 with the upper part broken away to show the internal construction of the head.

The internal structure of the head 20 is shown in FIG. 2. The channel 21 serves as a guide for the rails of the strap rungs 32. Extending into the guide channel 21 is a locking tang 25, which is pivotally mounted in the lower auxiliary channel 23. The latter is narrower than the guide channel 21 and receives the locking tang 25 when the strap is moved in the direction indicated by the forward thrust arrow F. The side walls of the lower channel 22 are spaced apart to receive the locking tang 25 without binding effect but are advantageously closely enough spaced to prevent any undesired lateral deflection of the locking tang.

As shown in FIG. 2, the locking tang is in its equilibrium position after having been deflected into the lower channel 23 by the forward motion of one of the rungs 32. After the items 11 (FIG. 1) have become securely bundled and the forward thrust F applied to the strap is terminated, the bundled items apply a reverse thrust by which the nearest of the rungs 32 forces the locking tang 25 into the upper channel 22 between narrow side walls, of which one such wall 22w is shown in FIG. 2, until the tang 25 comes into contact with an inclined, planar stop 22s that blocks the upper channel 22.

Figure 3A:
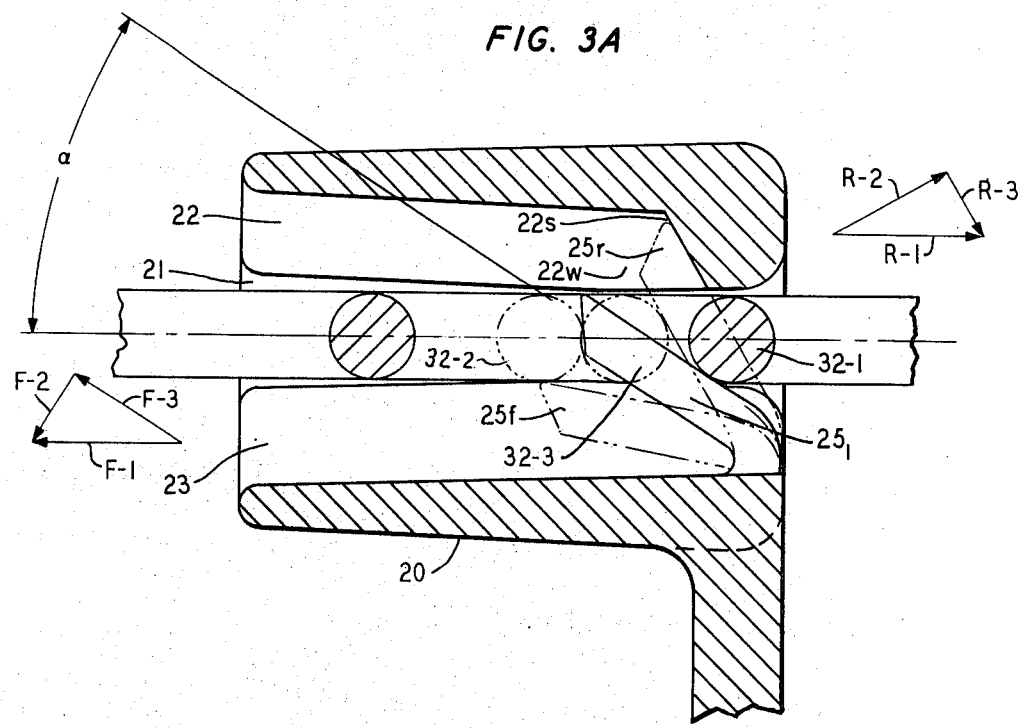
FIG. 3A is a cross-sectional view of an alternative harnessing device head in accordance with the invention.

The forward and reverse thrust movements of a representative locking tang $25_1$ are illustrated in FIG. 3A. The tang $25_1$ has a blunt end that is perpendicular to the direction of thrust, by contrast with the blunt end of the tang 25 in FIG. 2 which is parallel to the direction of thrust. When forward thrust F-1 is applied to the strap in FIG. 3A, and one of the rungs 32-1 engages the locking tang $25_1$, there is a component of thrust F-2 that is perpendicular to the tang and another component of thrust F-3 along the tang. The forward thrust F-1 produces a counter-wise deflection of the tang $25_1$ into the lower channel 23, with the tang ultimately reaching the phantom position 25f. It is to be noted that as the downward deflection of the tang into the channel 23 increases, the perpendicular component of thrust F-2 decreases until the deflecting rung of the strap occupies the phantom position 32-2, after which the natural resiliency of the tang $25_1$ restores it to its equilibrium position.

When the forward thrust F-1 on the strap of FIG. 3A is terminated, the reverse thrust R-1 exerted by the bundled items 11 (FIG. 1) causes the rung in the phantom position 32-3 to bear against the tang $25_1$. Ultimately, as a result of the reverse thrust, the locking tang $25_1$ occupies the phantom position 25r in abutting relationship with the inclined planar stop 22s. In this position, the reverse thrust R-1 has a component R-2 that is perpendicular to the stop surface 22s and another component R-3 along the surface of the tang. In the rest or locked position of the tang $25_1$ the compression component R-2 is maximum. In addition, as the tang $25_1$ moves to the phantom position 25r, the lever arm decreases so that the resistance of the tang to reverse deflection increases as the deflection increases. Thus the tang tends to resist the reverse thrust deflection applied by the items that have been harnessed. This is by contrast with conventional harnessing devices in which there is no increase in counter-deflection.

As shown by FIG. 3A, the locking tang $25_1$ is positioned within the head 20 to facilitate the forward thrust of the strap and at the same time impede reverse thrust. Thus, the counterclockwise deflection of the locking tang into the lower auxiliary channel 23 is facilitated by the position of the tang, while the clockwise deflection from equilibrium caused by reverse thrust is resisted. FIG. 3A also shows that the height of the guide channel 21 near the output end exceeds the height of the channel near the locking tang $25_1$. This promotes the feed of the strap in the guide channel.

In addition the walls 22w of the upper auxiliary channel 22 can be tapered towards the end of the head containing the inclined planar stop 22s, so that as the locking tang $25_1$ moves upwardly into the channel 22 it becomes wedged between the walls 22w.

Figure 3B:
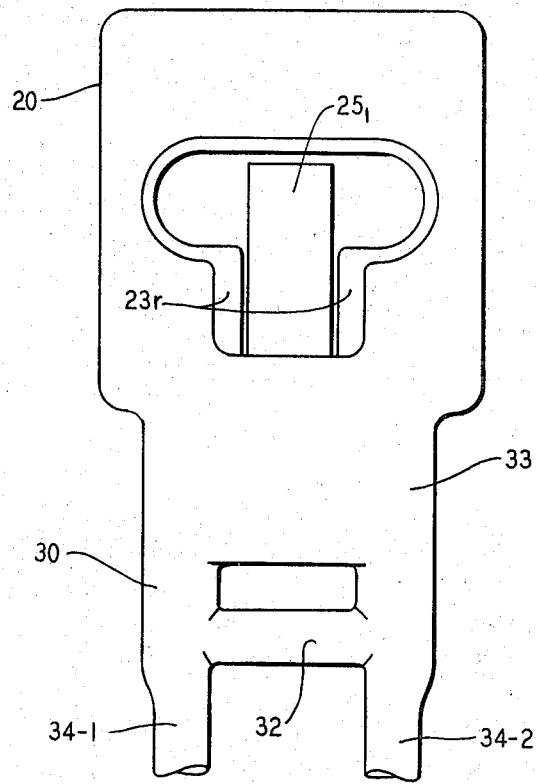
FIG. 3B is a frontal view of the harnessing device head shown in cross-section in FIG. 3A.

A frontal view of the locking head 20 of FIG. 3A in FIG. 3B shows that when the locking tang $25_1$ is in equilibrium, the guide channel is fully occupied, but the tang does not extend into the upper auxiliary channel (not visible in FIG. 3B). The portion of the locking tang $25_1$ which is pivotally mounted in the lower auxiliary channel is flanked by ramp surfaces 23r. These surfaces facilitate the entry of the rails 34-1 and 34-2 of the strap 30 into the guide channel and are of a width determined by the extent to which an inclined ramp effect is desired at the entrance of the locking head 20. It is to be noted that the strap 30 which is attached to the locking head is shown to have a neck 33 that is wider than the remainder of the strap between the rails 34-1 and 34-2. When the harnessing device is of nylon, the strap 30 is deliberately made oversized. It is then stretched, except at the neck 33, to a suitable width to permit easy entry into the guide channel of the head 20.

Figure 4:
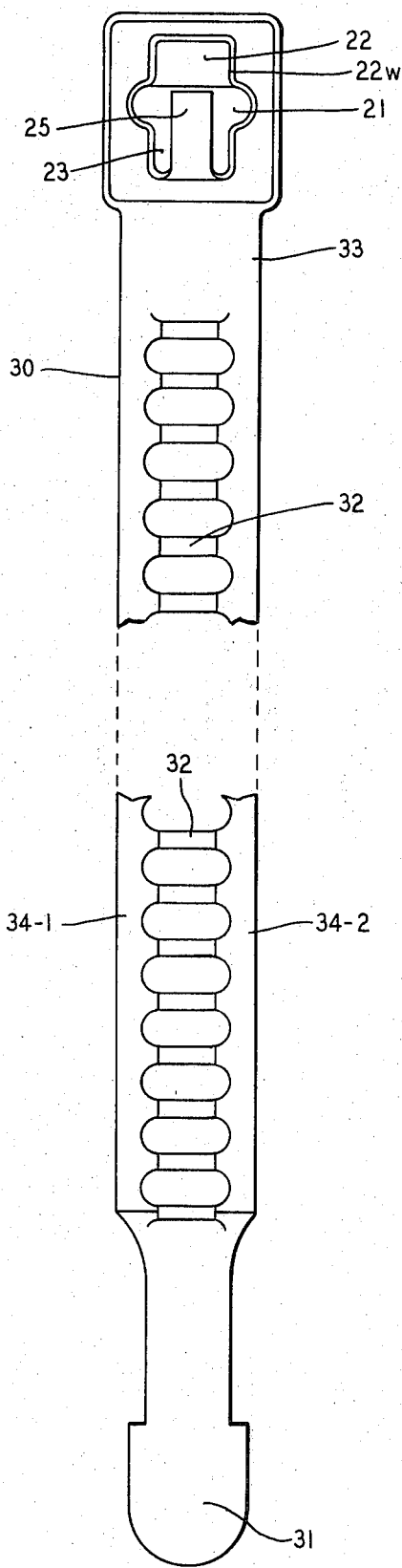
FIG. 4 is a plan view of a harnessing device in accordance with the invention having an attached strap with a width exceeding that of the guide channel in the head.
Figure 5:
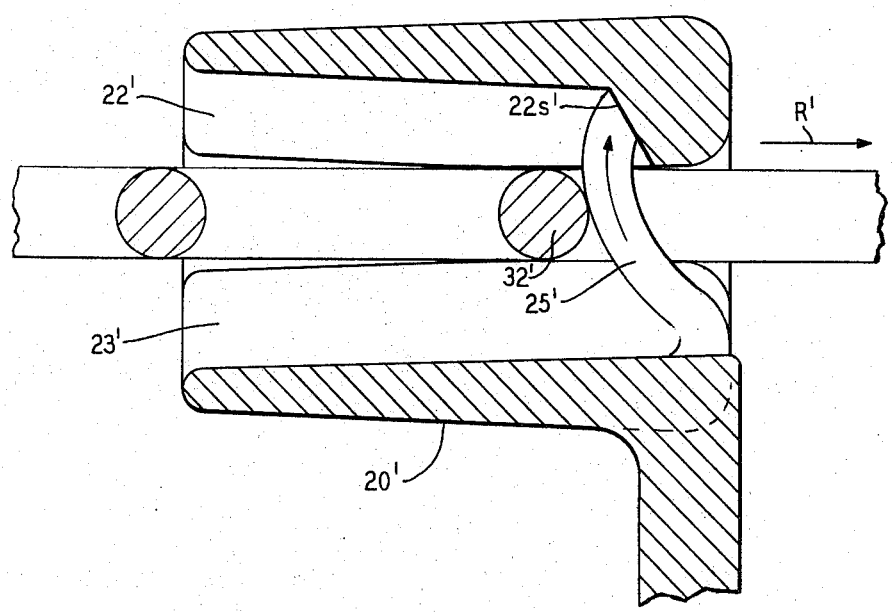
FIG. 5 is a cross-sectional view of another alternative head configuration for a harnessing device in accordance with the invention.

A plan view of a harnessing device with an oversized strap 30 is shown in FIG. 4. As noted above, this kind of strap is formed when the harnessing device is fabricated of nylon and the strap is thereafter stretched to produce the desired ladder configuration below the head shown by FIG. 3B. Alternatively, the strap 30 of FIG. 4 can be used without being pre-stretched when the harnessing device is fabricated of a stretchable elastomeric material. In that event, when the tab 31 is inserted into the guide channel 21, the strap becomes stretched over the items being harnessed by the forward thrust applied by the user. When the forward thrust is terminated, and the harnessed items exert a reverse thrust, there is resistance to that thrust by virtue of the action of the locking tang 25, but there is additional resistance to the reverse thrust by virtue of the unstretched guide rails 34-1 and 34-2 that result between the tab 31 and the output of the guide channel. This increases the security of the harnessing device.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. A harnessing device comprising an enclosed head having a guide channel extending longitudinally therethrough,
    a locking tang confined within the enclosure of said head and mounted for pivotal movement with respect to said channel, and a strap extending perpendicularly from said head with respect to said channel,
    said strap being formed by a ladder structure with rungs which are sequentially engaged by said locking tang when said strap is inserted into and through said channel around one or more items to be harnessed.

2. The harnessing device of claim 1 further including an auxiliary channel, narrower than said guide channel and located on one side thereof, for receiving said locking tang during the deflection thereof by reverse thrust applied to said strap by the harnessed items.

3. A harnessing device as defined in claim 2 wherein the channel for said locking tang includes an inclined planar stop at an acute angle to said strap against which said locking tang becomes abutted and makes planar contact during the deflection thereof by said reverse thrust.

4. A harnessing device as defined in claim 3 wherein the walls of said auxiliary channel converge towards said stop.

5. A harnessing device as defined in claim 3 wherein said locking tang is curved to resist buckling and has a blunt end which engages said planar stop as reverse thrust is applied thereto by said strap.

6. The harnessing device of claim 2 including another auxiliary channel, narrower than said guide channel and located on the other side thereof, in which said locking tang is pivotally mounted and completely received during the deflection thereof by said strap during the harnessing of said items.

7. A harnessing device as defined in claim 1 wherein said locking tang is pivotally mounted at an angle at one end of said channel to resist the reverse thrust applied to said strap by the harnessed items.

8. A harnessing device as defined in claim 7 wherein said locking tang is mounted adjacent said strap at an acute angle with respect to the direction of motion of said strap in said guide channel.

9. A harnessing device as defined in claim 1 wherein the ladder portion of said strap is stretchable and has a width which exceeds that of said guide channel.

10. A harnessing device as defined in claim 9 wherein said strap is stretched so that the width over a major portion of the length thereof is less than that of said guide channel.

11. A harnessing device comprising a head having a guide channel extending longitudinally therethrough, a locking tang confined within said head and mounted for pivotal movement with respect to said channel, a strap extending perpendicularly from said head with respect to said channel, said strap being formed by a ladder structure with rungs which are sequentially engaged by said locking tang when said strap is inserted into and through said channel around one or more items to be harnessed, and an auxiliary channel, narrower than said guide channel and located on one side thereof, for receiving said locking tang during the deflection thereof by reverse thrust applied to said strap by the harnessed items, the channel for receiving said locking tang including an inclined planar stop at an acute angle to said strap against which said locking tang becomes abutted and makes planar contact during the deflection thereof by said reverse thrust.

12. A harnessing device comprising a head having a guide channel extending longitudinally therethrough, a locking tang confined within said head and mounted for pivotal movement with respect to said channel, a strap extending perpendicularly from said head with respect to said channel, said strap being formed by a ladder structure with rungs which are sequentially engaged by said locking tang when said strap is inserted into and through said channel around one or more items to be harnessed, a first auxiliary channel, narrower than said guide channel and located on one side thereof, for receiving said locking tang during the deflection thereof by reverse thrust applied to said strap by the harnessed items, and a second auxiliary channel, narrower than said guide channel and located on the other side thereof, in which said locking tang is pivotally mounted and completely received during the deflection thereof by said strap during the harnessing of said items.

13. A harnessing device comprising a head having a guide channel extending longitudinally therethrough, a locking tang confined within said head and mounted for pivotal movement with respect to said channel, and a strap extending perpendicularly from said head with respect to said channel, said strap being formed by a ladder structure with rungs for sequentially engaging said locking tang when said strap is inserted into and through said channel around one or more items to be harnessed, the ladder portion of said strap being stretchable and having a width which exceeds that of said guide channel.

14. A harnessing device as defined in claim 13 wherein the ladder portion of said strap is stretched over at least a portion of the length thereof to a width less than that of said guide channel.

15. A harnessing device comprising a head having an elongated, straight guide channel extending therethrough, a deflectable locking tang within said head and a strap formed by a ladder structure with rungs which are sequentially engaged by said locking tang when said strap is inserted into said channel.

16. A harnessing device as defined in claim 15 wherein one end of said strap is attached to said head at an angle with respect to the axis of insertion of the other end of said strap into said channel.

17. A harnessing device as defined in claim 15 further including an auxiliary channel communicating with said guide channel for trapping said locking tang during the application of reverse thrust thereto by said strap.

18. A harnessing device as defined in claim 15 wherein the walls of said guide channel converge towards one end of said head.

19. A harnessing device as defined in claim 15 wherein said locking tang is positioned at one end of said head.

20. A harnessing device comprising a head having an elongated guide channel extending therethrough, there being a first auxiliary channel within said head on one side of said channel, a deflectable locking tang within said head in said first channel and extending into said guide channel, a strap having a set of apertures which are sequentially entered by said locking tang when said strap is inserted by forward thrust into said guide channel, and a second auxiliary channel within said head on the other side of said guide channel for said locking tang when reverse thrust is applied to said strap.

21. A harnessing device as defined in claim 20 wherein one end of said strap is attached to said head at an angle with respect to the axis of insertion of the other end of said strap into said channel.

22. A harnessing device as defined in claim 20 wherein said second auxiliary channel is proportioned to trap said locking tang when reverse thrust is applied thereto by said strap.

23. A harnessing device as defined in claim 22 wherein said locking tang is trapped by a stop member which blocks said second auxiliary channel.

24. A harnessing device as defined in claim 20 wherein the walls of said guide channel, said first auxiliary channel and said second auxiliary channel converge towards one end of said head.

25. A harnessing device as defined in claim 20 wherein said locking tang is positioned in said first auxiliary channel at one end of said head.

26. A harnessing device comprising a head having a guide channel extending therethrough, a deflectable locking tang confined in said head and an apertured strap having an initial width which exceeds that of said guide channel, said strap being stretchable over at least a portion thereof to a width less than that of said guide channel for insertion thereinto.

27. A harnessing device as defined in claim 26 wherein one end of said strap is attached to said head at an angle with respect to the axis of insertion of the other end of said strap into said guide channel.

28. A harnessing device as defined in claim 26 wherein at least a portion of the length of said strap, commencing at said initial width, is stretched to a width less than that of said guide channel.

29. A harnessing device as defined in claim 26 wherein the stretchable portion of said strap comprises a plurality of rungs, spaced from one another, extending between first and second longitudinal rails.

* * * * *